(12) United States Patent
Liu et al.

(10) Patent No.: US 8,463,698 B2
(45) Date of Patent: Jun. 11, 2013

(54) SYSTEMS AND METHODS TO SELECT A CREDIT MIGRATION PATH FOR A CONSUMER

(75) Inventors: Alexander A. Liu, New York, NY (US); Ron Hynes, Ridgefield, CT (US)

(73) Assignee: MasterCard International Incorporated, Purchase, NY (US)

( * ) Notice: Subject to any disclaimer, the term of this patent is extended or adjusted under 35 U.S.C. 154(b) by 874 days.

(21) Appl. No.: 11/965,121

(22) Filed: Dec. 27, 2007

(65) Prior Publication Data

US 2009/0171834 A1    Jul. 2, 2009

(51) Int. Cl.
*G06Q 40/00*    (2012.01)
*G06Q 40/02*    (2006.01)

(52) U.S. Cl.
CPC .................................. *G06Q 40/02* (2013.01)
USPC ................... 705/38; 705/35; 705/37; 705/39; 705/26; 705/40

(58) Field of Classification Search
USPC ...................... 705/38, 35, 37, 39, 26
See application file for complete search history.

(56) References Cited

U.S. PATENT DOCUMENTS

| | | | |
|---|---|---|---|
| 6,158,657 A * | 12/2000 | Hall et al. | 235/380 |
| 7,249,076 B1 * | 7/2007 | Pendleton et al. | 705/35 |
| 2002/0194122 A1 * | 12/2002 | Knox et al. | 705/39 |
| 2003/0046222 A1 * | 3/2003 | Bard et al. | 705/38 |

* cited by examiner

*Primary Examiner* — Tien Nguyen
(74) *Attorney, Agent, or Firm* — Buckley, Maschoff & Talwalkar LLC

(57) ABSTRACT

According to some embodiments, supplemental information about a consumer is determined, the consumer being associated with a first level of credit availability. One of a plurality of potential credit migration paths may then be selected for the consumer based on the supplemental information. Each potential credit migration path may, for example, begin at the first level of credit availability, include a plurality of intermediate credit products, and end at a level of credit availability higher than the first level. An offer for an intermediate credit product may then be transmitted to the consumer based on the selected credit migration path.

14 Claims, 12 Drawing Sheets

1000

| CREDIT MIGRATION PATH IDENTIFIER 1002 | CREDIT PRODUCTS 1004 | THRESHOLD SCORE VALUE 1006 |
|---|---|---|
| CMP 11 | CP5002, CP5003 | 90 |
| CMP 12 | CP3012, CP3018, CP4324 | 90 |
| CMP 13 | CP5002, CP5009 | 60 |

| CREDIT PRODUCT IDENTIFIER 1102 | DESCRIPTION 1104 | ASSOCIATED MIGRATION PATH(S) 1106 | POTENTIAL CONSUMER 1108 | OFFER DATE 1110 | OFFER STATUS 1112 |
|---|---|---|---|---|---|
| CP1001 | UNSECURED CREDIT CARD | CMP 06 | C1001 | 9/6/09 | ACCEPTED |
| CP1002 | UNSECURED CREDIT CARD | CMP 06; CMP 08 | C1004 | 9/6/09 | DECLINED |
| CP1003 | OVERDRAFT PROTECTION | CMP 01 | C1002 | 9/6/09 | PENDING |

FIG. 11

SYSTEMS AND METHODS TO SELECT A CREDIT MIGRATION PATH FOR A CONSUMER

FIELD

The present invention relates to consumer credit accounts and products. In particular, the present invention relates to systems and methods wherein an appropriate credit migration path may be selected for a consumer.

BACKGROUND

Many consumers may find it difficult to receive credit products, such as traditional credit cards. For example, consumers without a bank account, consumers with few assets, and/or consumers without an established credit history may be unable to open a traditional credit card account. One reason for this difficultly is that traditional credit products are often offered to consumers based on their credit history or credit "score." As a result, consumers who do not have a credit history (or who have a low credit score) are often not served, or are under-served, with respect to credit products. For example, a consumer with a low credit score may be unable to open a traditional credit card account.

In some cases, these consumers are provided with access to other types financial services, such as pre-paid transaction cards. The use of such services, however, is not typically reflected in the consumer's credit score. Therefore, using a pre-paid transaction card will not provide an opportunity for the consumer to eventually migrate to credit products. Moreover, a consumer may be unaware of other, intermediate types of credit products that may be available and/or not realize how the use of such products might eventually allow him or her to obtain a traditional credit card account.

It would be desirable to provide systems and methods that would let responsible consumers eventually receive credit products. It would be particularly advantageous if such a system operated in a timely and reliable fashion.

SUMMARY

To alleviate problems inherent in the prior art, the present invention introduces systems and methods wherein an appropriate credit migration path may be selected for a consumer.

According to one embodiment, supplemental information about a consumer associated with a first level of credit availability is determined. One of a plurality of potential credit migration paths is selected for the consumer based on the supplemental information, wherein each potential credit migration path: begins at the first level of credit availability, includes a plurality of intermediate credit products, and ends at a level of credit availability higher than the first level. An offer for an intermediate credit product may then be transmitted to the consumer based on the selected credit migration path.

Another embodiment of the present invention comprises: means for associating a consumer with a pre-paid card account associated, the consumer being associated with a first level of credit availability; means for receiving a transaction request, associated with the pre-paid card account, from a remote merchant device; means for transmitting a transaction approval to the remote merchant device; means for transferring funds out of the pre-paid card account based on the transaction request; means for receiving a re-load indication from the consumer; means for transferring funds for the consumer to re-load the pre-paid card account in response to the re-load request; means for storing transaction information associated with the consumer's usage of the pre-paid card account; means for receiving from a third-party supplemental information associated with the consumer; means for based on the stored transaction information and the supplemental information, automatically generating a score associated with the consumer; means for selecting for the consumer one of a plurality of potential credit migration paths based on the generated score and threshold values associated with each potential credit migration path, wherein each potential credit migration path: begins at the first level of credit availability, includes a plurality of intermediate credit products, and ends at a level of credit availability higher than the first level; and means for offering the consumer an intermediate credit product based on the selected credit migration path.

With these and other advantages and features of the invention that will become hereinafter apparent, the invention may be more clearly understood by reference to the following detailed description of the invention, the appended claims, and the drawings attached herein.

BRIEF DESCRIPTION OF THE DRAWINGS

FIG. 10 is a portion of a tabular representation of a migration path database according to some embodiments.

FIG. 11 is a portion of a tabular representation of a credit product database according to some embodiments.

DETAILED DESCRIPTION

Some embodiments of the present invention are associated with a "consumer" who uses a pre-paid card account and/or receives offers for consumer credit products. As used herein, the term "consumer" might refer to, for example, a person (or entity) who executes transactions with merchants. Moreover, the term "pre-paid card account" might refer to, for example, any financial account used by the consumer to perform such transactions without utilizing traditional credit products (or with only limited utilization of such products). In addition, the phrase "credit product" might refer to, for example, a traditional credit card account, a private label credit card account, a card account having overdraft protection, and/or a partially secured credit card account.

Figure 1:
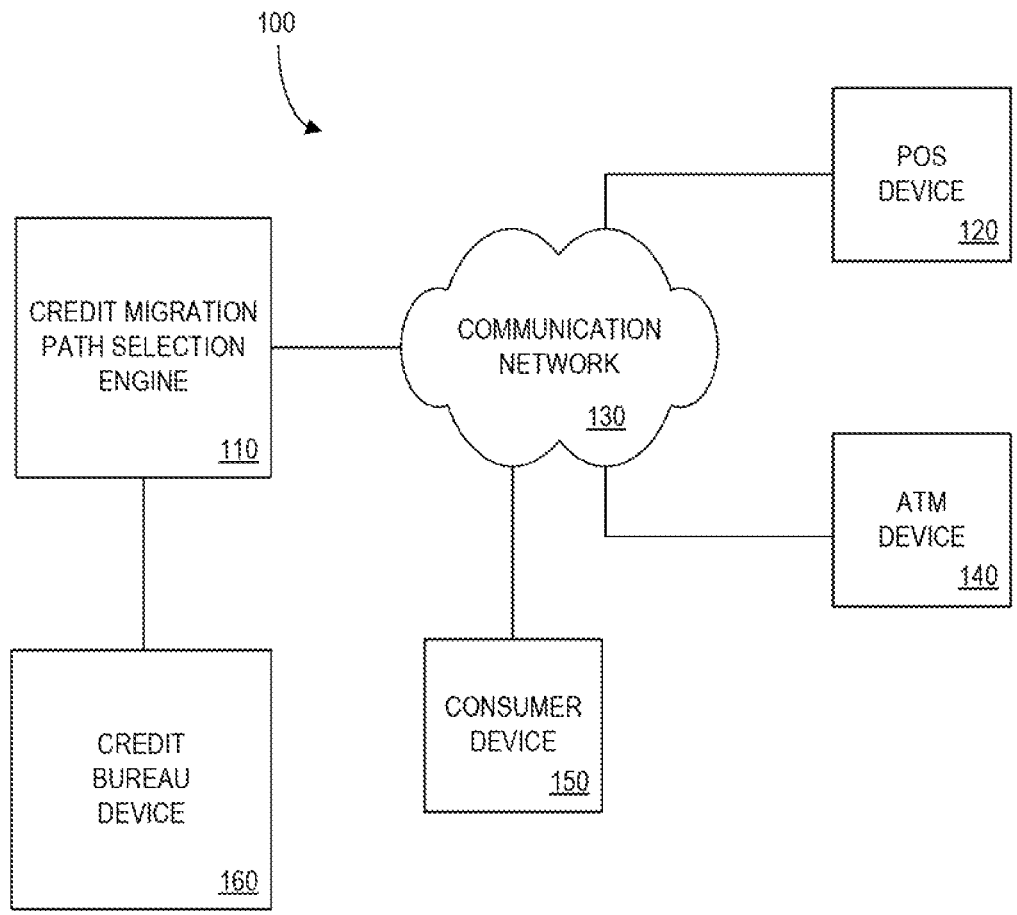
FIG. 1 is a block diagram representation of a system that may be provided according to some embodiments.

Turning now in detail to the drawings, FIG. 1 is a block diagram representation of a system 100 that may be provided according to some embodiments. The system 100 includes a credit migration path selection engine 110 in communication with other devices via a communication network 130. The credit migration path selection engine 110 may be associated with, for example, a financial institution such as a company or service that offers pre-paid card accounts and/or traditional credit card products to consumers.

As used herein, devices (including the credit migration path selection engine 110) may communicate, for example, via a communication network 130 such as a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a cable television network, or an Internet Protocol (IP) network such as the Internet, an intranet or an extranet. Moreover, as used herein, communications include those enabled by wired or wireless technology. Although a single credit migration path selection engine 110 and communication network 130 are shown in FIG. 1, any number of such devices and networks may be included in the system 100. Similarly, any number of the other devices described herein may be included in the system 100 according to embodiments of the present invention.

Consider, for example, the case wherein the credit migration path selection engine 110 is associated with a financial institution. In this case, the engine 110 might communicate with, for example, one or more Point Of Sale (POS) devices 120, such as remote POS terminals located at various merchant and/or retail establishments. The POS devices 120 might include magnetic stripe card readers, proximity coupling devices and/or other peripheral devices which allow the terminals to receive account numbers from pre-paid payment cards presented at the terminal by cardholders (consumers) to pay for transactions. The pre-paid cards may be physically similar to conventional credit or debit cards, for example. After reading or otherwise receiving a pre-paid card account number, a POS device 120 submits a request for authorization of the transaction. The request for authorization typically includes the pre-paid card account number, the amount of the transaction, the identity of the merchant which operates the POS device 120, and other information. In some embodiments, the POS device 120 operates in a conventional manner. The engine 110 may then determine whether the requested transaction is to be authorized. According to some embodiments, such an engine 110 is operated by a payment card association, such as MasterCard International Incorporated, the assignee hereof.

The engine 110 might also communicate with, for example, one or more Automated Teller Machine (ATM) devices 140. For example, a consumer might present a pre-paid card at an ATM device 140 and enter his or her Personal Identification Number (PIN). After the information is verified, the consumer might use the ATM device 140 to receive cash from his or her pre-paid card account and/or to re-load funds into his or her pre-paid card account. In some embodiments, the ATM device 140 operates in a conventional manner.

In addition or alternatively, the system 100 may include a call center (not illustrated in FIG. 1). The call center may be staffed by human operators who take telephone calls from consumers and/or merchants (in addition or alternatively the call center may include an automatic voice response unit). In such an embodiment, the call center human operators may receive information from the consumers and/or merchants to authorize cash disbursements and/or purchases.

The engine 110 might also communicate with, for example, one or more consumer devices 150. For example, the credit migration path selection engine 110 might communicate with a remote Personal Computer (PC) or laptop computer associated with a consumer via the Internet. Although some embodiments are described with respect to information exchanged via a Web site, according to other embodiments information is instead exchanged, for example, via: a telephone, an Interactive Voice Response Unit (IVRU), electronic mail, a cable network interface, and/or a wireless communication system. The consumer device 150 may be any device capable of performing various functions described herein. The consumer device 150 might be, for example, a Personal Digital Assistant (PDA) or a wired or wireless telephone. A consumer may use the consumer device 150, for example, to make on-line purchases or bill payments, to apply for pre-paid card accounts, and/or to receive and/or accept offers for credit products.

According to some embodiments, the credit migration path selection engine 110 also communicates with a credit bureau device 160. For example, the credit migration path selection engine 110 may receive supplemental information about a consumer (e.g., an EQUIFAX® credit score) from the credit bureau device 160. Although a separate credit migration path selection engine 110 and credit bureau device 160 are shown in FIG. 1, some or all of these devices may be incorporated in a single device.

The credit migration path selection engine 110 may operate in accordance with any of the embodiments described herein. For example, the engine 110 might use information received from the credit bureau device 160 to select an appropriate credit migration path for a particular consumer.

Figure 2:
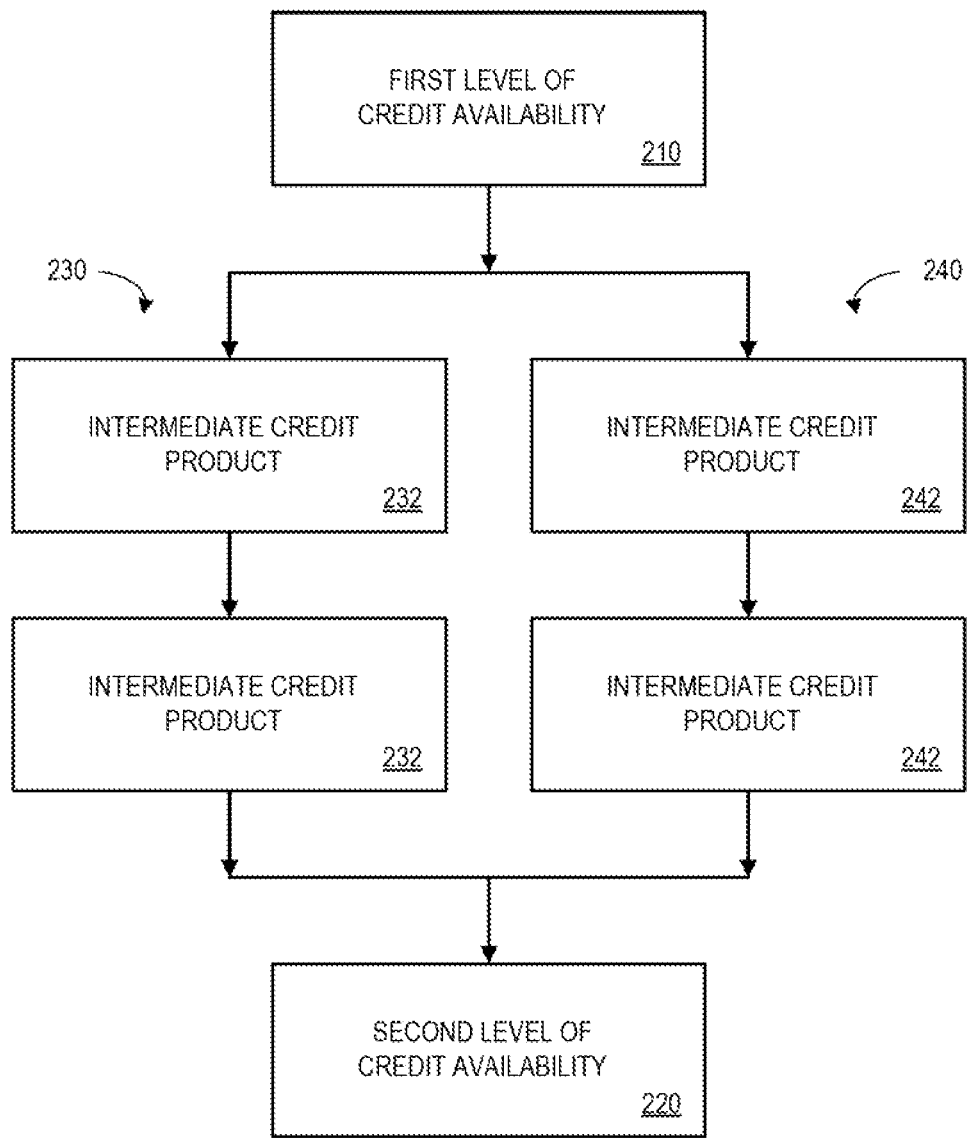
FIG. 2 illustrates potential credit migration paths for a consumer according to some embodiments.

FIG. 2 illustrates potential credit migration paths for a consumer according to some embodiments. In particular, the consumer might start at a first level of credit availability 210 and wish to eventually achieve a second, higher level of credit availability 220. By way of example only, the consumer might start with absolutely no access to credit and wish to eventually open a traditional, unsecured credit card account.

According to some embodiments, a plurality of potential credit migration paths 230, 240 may be defined such that the consumer may move from the first level of credit availability 210 to the second level of credit availability 220. For example, the first potential credit migration path 230 might include a number of intermediate credit products 232 while the second potential credit migration path 240 has different intermediate credit products 242. In this case, the credit migration path selection engine 110 might select the first path 230 as being the most appropriate one consumer and the second path 240 for another consumer.

Figure 3:
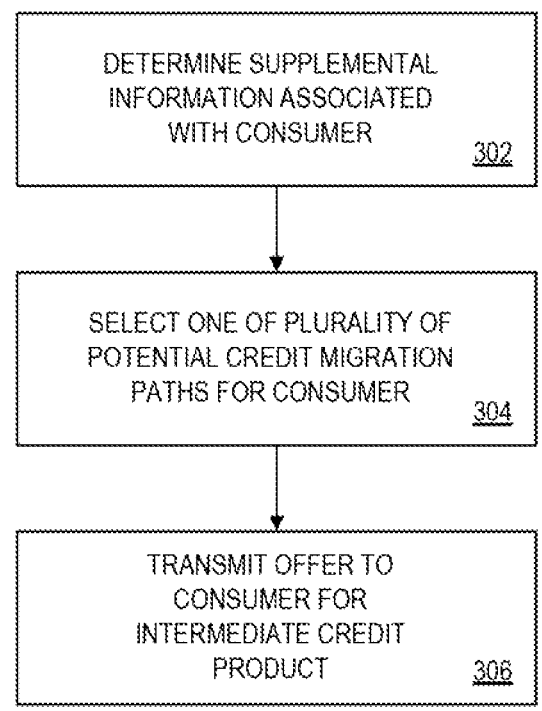
FIG. 3 is a flow chart that illustrates a method that may be performed according to some embodiments.

FIG. 3 is a flow chart that illustrates a method that may be performed according to some embodiments. The flow charts in FIG. 3 and the other figures described herein do not imply a fixed order to the steps, and embodiments of the present invention can be practiced in any order that is practicable. Moreover, the methods may be performed by any of the devices described herein. The method shown in FIG. 3 may be performed, for example, by the credit migration path selection engine 110 of FIG. 1 and/or the financial institution device 500 of FIG. 5. Note that the elements of FIG. 3 and the other FIGS. described herein may be performed by different parties. For example, each element might be performed by a different party (e.g., by an issuer, an account processor, or any other agent or party). Moreover, any single element might be performed by multiple parties.

At 302, "supplemental" information about a consumer associated with a first level of credit availability is determined. For example, information about the consumer's spending habits might be tracked by a financial institution and/or be received from a credit bureau. Example of supplemental information might include income data, expense data, payment history data (e.g., whether or not she has paid utility bills or rent in a timely fashion), net worth data, bankruptcy data, existing bank account balance or other asset data, employment data, and/or demographic data.

At 304, one of a plurality of potential credit migration paths is selected for the consumer based on the supplemental information. Each potential credit migration path might, for example, begin at the first level of credit availability, include a plurality of intermediate credit products, and end at a level of credit availability higher than the first level. By way of example, the first level of credit availability might be associated with a complete lack of credit, a partially secured credit card account, a pre-paid card account, and/or a card account having overdraft protection.

The "intermediate" credit products might be any type of product that will help the consume move from the lower level of credit availability to the higher level. Examples of intermediate credit products might include a partially secured credit card account, a pre-paid card account, and/or a card account having overdraft protection. The ending, higher level of credit availability that could eventually be achieved by the consumer might represent, for example, a partially secured credit card account, a private label credit card account, a card account having overdraft protection, and/or a traditional (unsecured) credit card account.

At 306, an offer for an intermediate credit product is transmitted to the consumer based on the selected credit migration path. For example, an offer for the first intermediate credit product in the selected migration path might be mailed or otherwise provided to the consumer.

Figure 4:
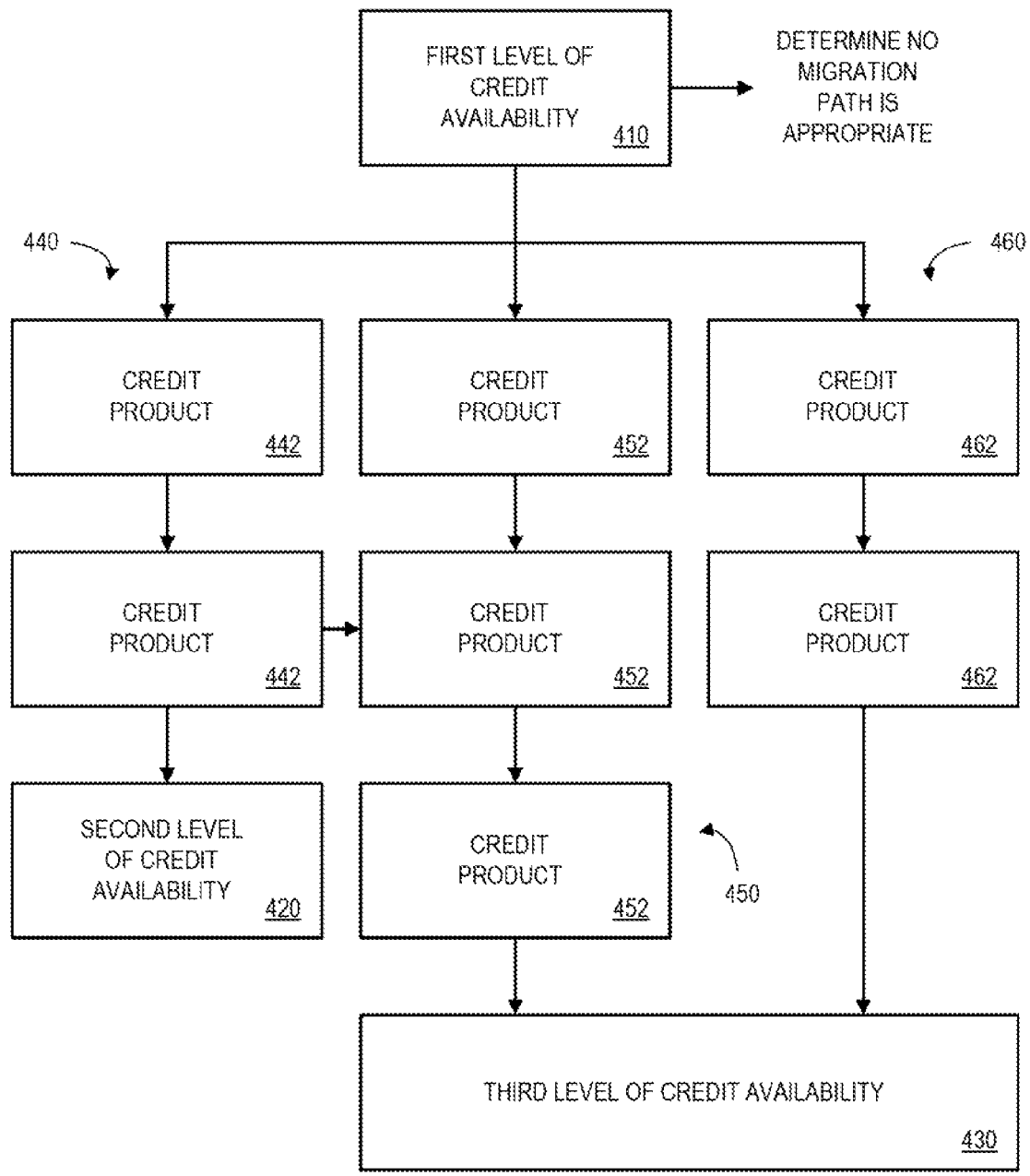
FIG. 4 is another example illustrating potential credit migration paths for a consumer according to some embodiments.

Note that the illustration of credit migration paths 230, 240 provided in FIG. 2 is merely exemplary and any number of other structures could be provided instead. For example, FIG. 4 is another example illustrating potential credit migration paths for a consumer according to some embodiments. As before, a consumer might initially be at a first level of credit availability 410. In some cases, it may be determined that no credit migration path is appropriate for that consumer.

In other cases, it might be determined that the consumer could achieve a second, higher level of credit availability 420 through a migration path 440 comprises an ordered series of credit products 442. In still other cases, it might be determined that the consumer could achieve a third level of credit availability 430 (e.g., higher than either the first or second levels 410, 420) through either of a pair of migration paths 450, 460—each including a series of intermediate credit products 452, 462. Note that according to some embodiments, a consumer might be moved between migration paths 440, 450 (e.g., based on a periodic evaluation of his or use of intermediate products along the way).

According to some embodiments, the migration paths 440, 450, 460 are pre-configured by a credit migration path designer (e.g., associated with a credit product company or service). According to other embodiments, some or all of the paths 440, 450, 460 may instead be automatically generated and/or modified by a process. In some cases, the generation of a path (including, for example, the selection and ordering of appropriate intermediate credit products) may be based at least in part on the actions of other consumers. For example, particular credit product might be inserted into, or removed from, a migration path based whether or not that product was accepted by other consumers and/or if the product was eventually used in a successful manner by other consumers.

Figure 5:
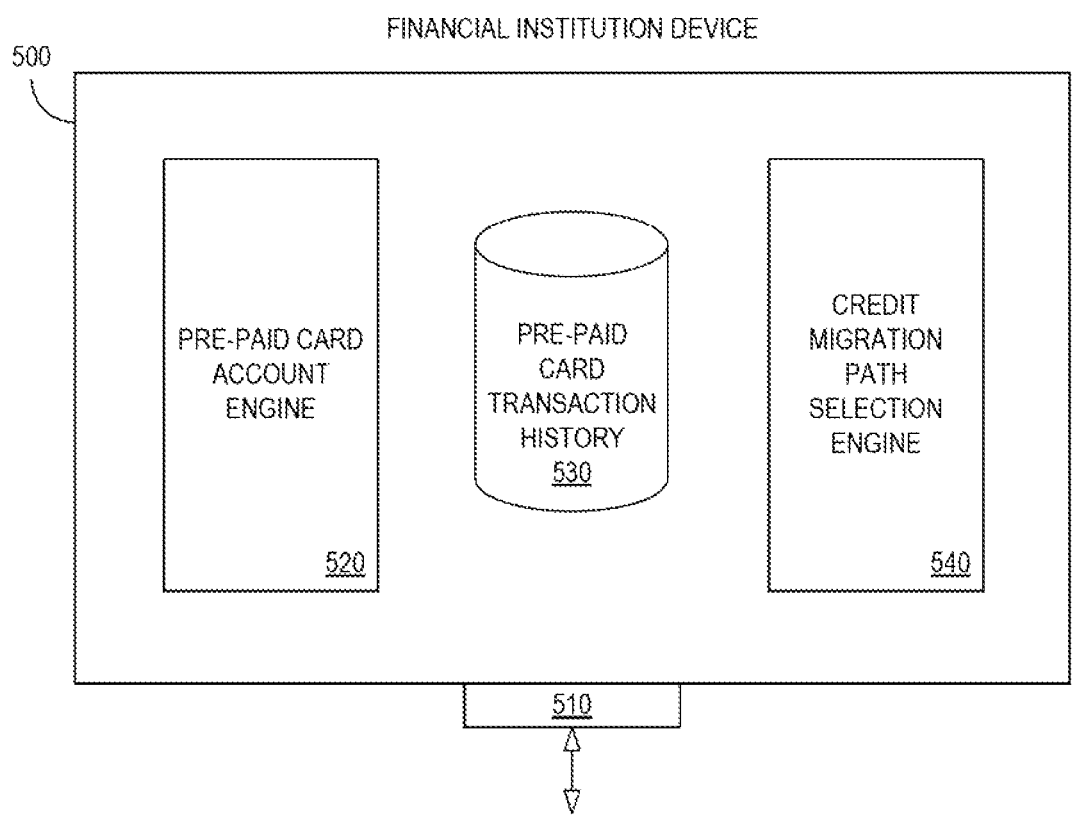
FIG. 5 is a block diagram of a financial institution device according to some embodiments.

FIG. 5 is a block diagram of a financial institution device 500, such as a device associated with the engine 110 of FIG. 1, according to some embodiments. In this case, the financial institution device 500 includes a communication port 510 to exchange data over a network to facilitate communication with, for example, other devices (such as POS devices 120, ATM devices 140, and consumer devices 150). Note that numerous ports 510 may be provided (to allow for simultaneous communication with a number of other devices) and may be preferably configured with hardware suitable to physically interface with desired external devices and/or network connections. For example, the communication port 510 may comprise an Ethernet connection to a local area network through which the financial institution device 500 may receive and transmit information over the Internet and/or over private or proprietary networks.

In addition, the financial institution device 500 includes a pre-paid card account engine 520 and a credit migration path selection engine 540 that may be constituted by one or more conventional processors. The engines 520, 540 operate to execute processor-executable process steps so as to control the financial institution device 500 to provide desired functionality. The financial institution device 500 further includes a storage device 530 to store pre-paid card transaction history information. Note that the engines 520, 540 and storage device 530 may be co-located with, or remote from, the financial institution device 500.

Figure 6:
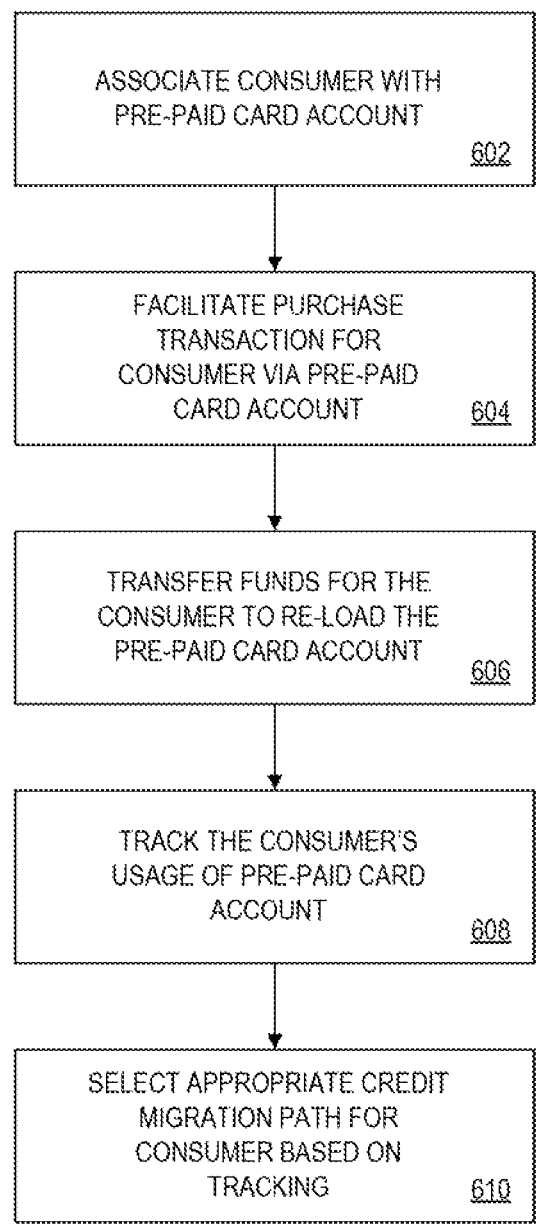
FIG. 6 is a flow chart that illustrates a method that may be performed according to some embodiments.

The financial institution device 500 may operate in accordance with any of the embodiments described herein. By way of example only, FIG. 6 is a flow chart that illustrates a method that may be performed according to some embodiments. At 602, a consumer may be associated with a pre-paid card account. For example, a consumer may apply for a pre-paid card account and provide an initial payment to be applied to the account. According to some embodiments, the pre-paid card account is co-branded with a retail partner. The pre-paid card account engine 520 may approve the consumer's application and arrange for a pre-paid card to be physically issued to the consumer.

At 604, purchase transactions are facilitated for the consumer via the pre-paid card account, including a transfer of funds out of the pre-paid card account. For example, the pre-paid card account engine 520 might receive an indication from a POS device that a particular account is being used to purchases goods or services. The pre-paid card account engine 520 may approve the transaction and reduce the amount of pre-paid funds available to that account by an appropriate amount. According to some embodiments, the pre-paid card account engine 520 might similarly facilitate the distribution of cash to the consumer (e.g., via an ATM device 140) and/or online purchases or bill paying.

Funds may also be transferred at 606 for the consumer to re-load the pre-paid card account. For example, the consumer might present his or her pre-paid card and provide cash to a merchant at a POS device 120. In this case, the pre-paid card account engine 520 might increase the amount of pre-paid funds available to that account by an appropriate amount. According to some embodiments, funds may be re-loaded through a direct payroll deposit and/or an online transfer. Note that in some embodiments, the steps performed at 604 and/or 606 may be performed by a financial institution acting as a bank account or a debit card processor substitute for the consumer.

At 608, the consumer's usage of the pre-paid card account is tracked. For example, the pre-paid card account engine 520 might update pre-paid card transaction history information in the storage device 530 each time a transaction is executed.

The usage information might include, for example, an amount of funds being spent or re-loaded, whether or not a request was denied, etc.

At 610, an appropriate credit migration path is selected for the consumer based on the information tracked at 608. For example, the credit migration path selection engine 540 may evaluate the usage information to determine which, if any, migration path should be selected for a particular consumer. The various credit products offered to the consumer in connection with the migration path might be associated with, for example, a traditional credit card account, a private label credit card account, a card account having overdraft protection (that is, the credit product might be linked to a pre-paid, debit, or other card account), and/or a partially secured credit card account. According to some embodiments, the credit migration path determined at 610 is further based on credit bureau data (e.g., a credit score received from a credit bureau device 160).

A credit product may then be offered to the consumer based on the selected migration path. For example, overdraft protection might be offered to the consumer based on his or her responsible use of a pre-paid card account. According to some embodiment, a rule or threshold value may be applied to the pre-paid account history information in order to select an appropriate credit migration path for the consumer. Note that the terms and conditions associated with various credit products in the migration path might also be based on his or her use of the pre-paid card account. The credit product may then be provided to the consumer (assuming the consumer accepts the offer).

Figure 7:
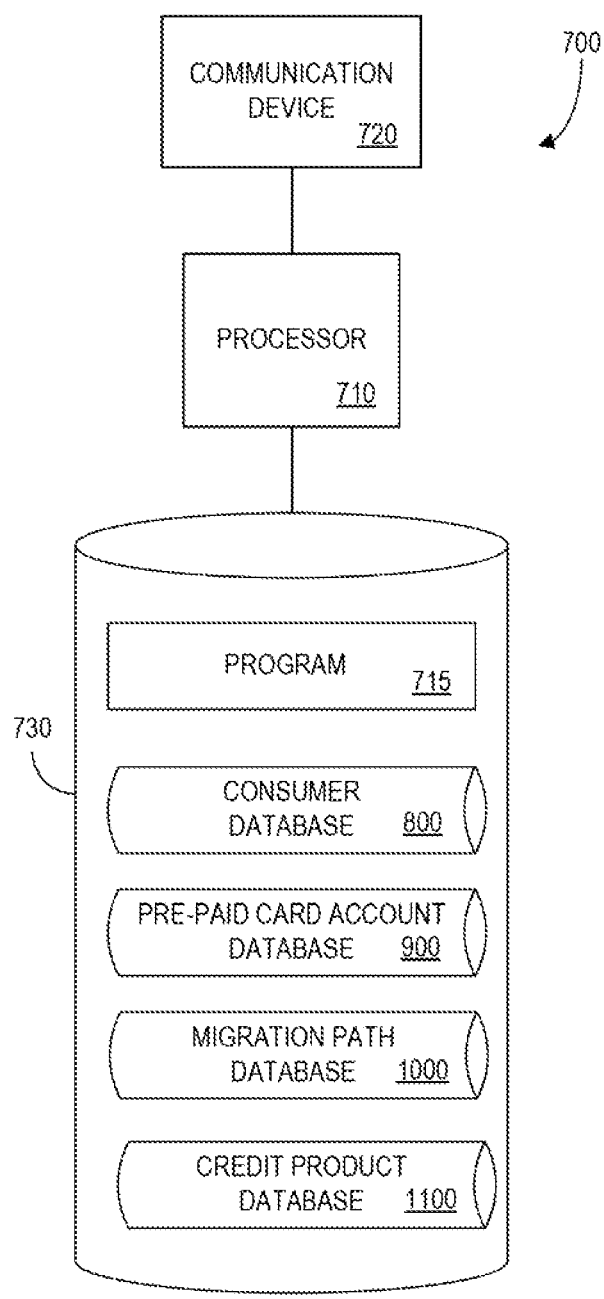
FIG. 7 is a block diagram of an apparatus according to some embodiments.

FIG. 7 is a block diagram of an apparatus 700 that may be descriptive of the devices shown in FIGS. 1 and/or 5 according to an embodiment of the present invention. The apparatus 700 comprises a processor 710, such as one or more INTELL® Pentium® processors, coupled to a communication device 720 configured to communicate via a communication network (not shown in FIG. 7). The communication device 720 may be used to communicate, for example, with POS devices 120, ATM devices 140, consumer devices 150, and/or credit bureau devices 160.

The processor 710 may also be in communication with a local input device (not shown in FIG. 7). The local input device may comprise, for example, a keyboard, a mouse or other pointing device, a switch, an infrared port, a docking station, and/or a touch screen. Such a local input device may be used, for example, to provide rules and threshold values associated with credit migration paths. The processor 710 may also be in communication with a local output device (not shown in FIG. 7). The local output device may comprise, for example, a display (e.g., a computer monitor), a speaker, and/or a printer. The local output device may be used, for example, to generate reports and/or export information to be used to generate credit product offers for consumers.

The processor 710 is also in communication with a storage device 730. The storage device 730 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 730 stores a program 715 for controlling the processor 710. The program 715 may be stored in a compressed, uncompiled and/or encrypted format. The program 715 may furthermore include other program elements, such as an operating system, a database management system, and/or device drivers used by the processor 710 to interface with peripheral devices.

The processor 710 performs instructions of the program 715, and thereby operates in accordance with the present invention. For example, the processor 710 may associate a consumer with a pre-paid card account and facilitate purchase transactions for the consumer via the pre-paid card account, including transfers of funds out of the pre-paid card account. The processor 710 may further arrange to transfer funds for the consumer to re-load the pre-paid card account and track the consumer's usage of the pre-paid card account. According to some embodiments, the processor 710 also selects an appropriate migration path of credit products to be offered to the consumer based on said tracking.

As used herein, information may be "received" by or "transmitted" to, for example: (i) the apparatus 700 from remote device; or (ii) a software application or module within the apparatus 700 from another software application, module, or any other source.

As shown in FIG. 7, the storage device 730 also stores a consumer database 800 (described with respect to FIG. 8), a pre-paid card account database 900 (described with respect to FIG. 9), a migration path database (described with respect to FIG. 10), and a credit product database 1100 (described with respect to FIG. 11). Examples of databases that may be used in connection with the apparatus 700 will now be described in detail with respect to FIGS. 8 through 11.

Note that the illustrations and accompanying descriptions of the databases 800, 900, 1000, 1100 presented herein are exemplary, and any number of other database arrangements could be employed besides those suggested by the figures. For example, as will be understood by those skilled in the art, the schematic illustrations shown herein and the following descriptions of the exemplary entries are merely examples of arrangements for stored representations of information. Any number of other arrangements may be employed besides that suggested by the tables shown. Similarly, the illustrated entries of the databases represent exemplary information only.

In a practical embodiment, the number of entries in the various databases may be in the thousands, or even in the millions. Moreover, for convenience of presentation, some databases are shown as having only six or fewer fields. However, in practice additional fields may be present, such as other fields for additional consumer contact information, social security number, etc. Moreover, the various databases may generally be integrated with other databases used for other purposes in addition to those described herein.

Also, note that the information stored in the databases 800, 900, 1000, 1100 may be stored by (or at) and/or accessed by any number of different parties or locations (e.g., by an issuer, an account processor, and/or any other agent or party). For example a credit product database 1100 might be partially stored at an issuing back's system and partially stored on that bank's outsourced credit processor's system (and, when combined, form the complete credit product database 1100).

Figure 8:
FIG. 8 is a portion of a tabular representation of a consumer database according to some embodiments.

FIG. 8 is a portion of a tabular representation of a consumer database 800 that may be stored at the apparatus 700 according to an embodiment of the present invention. The table includes entries identifying consumers associated with pre-paid card accounts and/or migration paths. The table also defines fields 802, 804, 806, 808, 810, 812 for each of the entries. The fields specify: a consumer identifier 802; a consumer name 804; a consumer address 806; a pre-paid account identifier 808; a current balance 810; and a score 812. The information in the consumer database 800 may be created and updated, for example, based on information received from a consumer when or she applies for a pre-paid card account. The information in the consumer database 800 may also be based on, for example, information from a credit bureau and/or information generated as the consumer uses his or her pre-paid card.

The consumer identifier 802 may be, for example, an alphanumeric code associated with a particular consumer. The consumer name 804 and consumer address 806 may further be associated with that consumer. The consumer information 802, 804, 806 may be generated by, for example, a financial institution or the consumer (e.g., when he or she provides information when applying for a pre-paid card account). The consumer address 806 might be associated with, for example, a postal mail address, an email address, or any other contact information (e.g., a telephone number). The consumer address 806 might be used, for example, to provide an offer for a credit product to qualified consumers.

The pre-paid account identifier 808 may comprise, for example, a unique account number or digital payment protocol information. The pre-paid account identifier 808 may be printed and/or encoded on a physical card or device and may be used, for example, to arrange for the consumer to provide or receive payment from his or her pre-paid account. The current balance 810 may reflect the funds that are presently available in the consumer's account.

The score 812 may be any metric that has been calculated for the consumer based on supplement information and/or his or her usage of the pre-paid card account. For example, certain behaviors by the consumer might increase the score 812 while other behaviors might decrease the score 812. Note that the score 812 might comprise a general classification, a ranking (e.g., as compared to other consumers), a probability, and/or a set of values.

Figure 9:
FIG. 9 is a portion of a tabular representation of a pre-paid card account database according to some embodiments.

FIG. 9 is a portion of a tabular representation of a pre-paid card account database 900 that may be stored at the apparatus 700 according to an embodiment of the present invention. The table includes entries identifying transactions associated with a pre-paid card account. The table also defines fields 902, 904, 906, 908, 910, 912 for each of the entries. The fields specify: a pre-paid account identifier 902; a consumer identifier 904; a transaction identifier 906; a transaction date 908; a transaction amount 910; and a transaction description 912. The information in the pre-paid card account database 900 may be created and updated, for example, based on information received from merchant devices. The information in the pre-paid card account database 900 may also be based on, for example, information generated as a consumer uses (or attempts to use) his or her pre-paid account card.

The pre-paid account identifier 902 may be, for example, an alphanumeric code associated with a particular pre-paid card account (and may be based on, or associated with, the pre-paid account identifier 808 in the consumer database 800). Similarly, the consumer identifier 904 may be, for example, an alphanumeric code associated with a consumer (and may be based on, or associated with, the consumer identifier 802 in the consumer database 800).

The transaction identifier 906, transaction date 908, and transaction amount 910 may represent a particular transaction associated with the pre-paid card account. For example, the transaction information 906, 908, 910 might indicate that a consumer has made a purchase from a particular merchant or has re-load funds to the account from an ATM device as indicated by the transaction description 912. According to some embodiments, the transaction description 912 might indicate that a particular transaction was not approved (e.g., because the current balance 510 was less than then the transaction amount 910).

FIG. 10 is a portion of a tabular representation of a migration path database 1000 that may be stored at the apparatus 700 according to an embodiment of the present invention. The table includes entries identifying credit migration paths that have been (or might be) selected for consumers. The table also defines fields 1002, 1004, 1006 for each of the entries. The fields specify: a credit migration path identifier 1002; a set of credit products 1004; and a threshold score value 1006. The information in the migration path database 1000 may be created and updated, for example, based on information received from credit product companies. The information in the migration path database 1000 may also be updated based on, for example, information generated as consumer's accept or decline credit product offers.

The credit migration path identifier 1002 may be, for example, an alphanumeric code associated with a particular credit migration path that might be selected for consumers. The credit products 1004 may be an ordered list representing intermediate credit products in a migration path may include, for example, alphanumeric codes associated with a particular credit products (and may be based on, or associated with, the credit product identifiers 1102 in the credit product database 1100).

The threshold score value 1006 may represent a condition that defines which consumers should be assigned to which credit migration paths. For example, the threshold score value 1006 might be compared to the scores 812 in the consumer database 800 to select a group of consumers who should receive offer for intermediate credit products in a particular migration path. Note that the threshold score value 1006 might comprise a general classification (e.g., "high" or "low" risk), a ranking (e.g., as compared to other consumers), a probability, and/or a set of values.

FIG. 11 is a portion of a tabular representation of a credit product database 1100 that may be stored at the apparatus 700 according to an embodiment of the present invention. The table includes entries identifying intermediate credit products that have been (or might be) offered to consumers. The table also defines fields 1102, 1104, 1106, 1108, 1110, 1112 for each of the entries. The fields specify: a credit product identifier 1102; a description 1104; associated migration paths 1106; a potential consumer 1108; an offer date 1110; and an offer status 1112. The information in the credit product database 1100 may be created and updated, for example, based on information received from credit card companies and/or consumers. The information in the credit product database 1100 may also be based on, for example, information generated as consumer's accept or decline credit card offers.

The credit product identifier 1102 may be, for example, an alphanumeric code associated with a particular intermediate credit product offer that might be provided to consumers, such as an unsecured credit card or overdraft protection as indicated by the description 1104. The associated migration paths 1106 might comprise, for example, an set of alphanumeric codes associated with various migration paths for the product (and may be based on, or associated with, the credit migration path identifier 1002 in the migration path database 1000).

The potential consumer 1108 may represent a consumer who has received an offer for the credit product in connection with a selected migration path (and may be based on, or associated with, the consumer identifier 802 in the consumer database 800). The offer date 1110 and offer status 1112 might indicate when the consumer received the offer and whether the offer was "accepted" or "declined" by the consumer (or if the offer is still "pending"). By way of example, the unsecured credit card offer associated with an identifier 1102 of "CP1001" might be provided to consumers in migration path "CMP 06."

Figure 12:
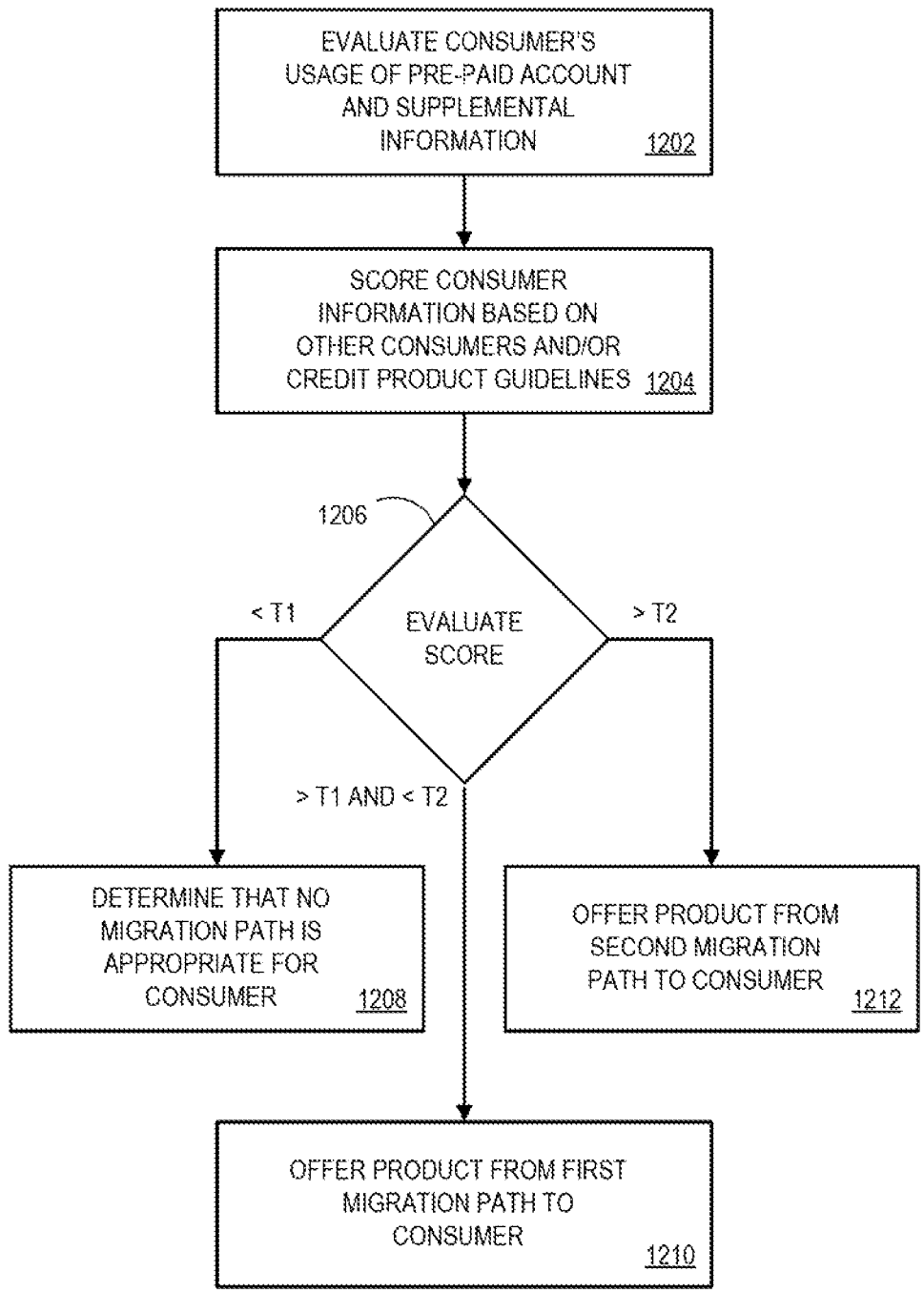
FIG. 12 is a flow chart that illustrates a method that may be performed according to some embodiments.

FIG. 12 is a flow chart that illustrates a method that may be performed according to some embodiments. The method might be performed, for example, after a consumer has been associated with a pre-paid card account for a pre-determined period of time. Note that a record will have been opened and updated in the consumer database 800 in connection with that account.

As he or she uses the account, various transaction requests may have been received from remote merchant devices, and various transaction approvals may have been transmitted to those devices. Moreover, funds will have been transferred out of the pre-paid card account based on the transaction request. Similarly, a number of re-load indications may have been received from the consumer, and funds will have been transferred to re-load the pre-paid card account in response to the re-load request.

As a result, transaction information associated with the consumer's usage of the pre-paid card account will be stored in the pre-paid card account database 900. At 1202, the information in the pre-paid card account database 900 is evaluated. For example, the transaction amounts 910, frequencies (based on transaction dates 908), and descriptions 912 may be evaluated. In addition, supplemental information associated with the consumer is received from a third party and evaluated at 1202. For example, whether or not the consumer typically pays a telephone bill (or rent) in a timely fashion may be evaluated along with his or her income/employment history, bankruptcy status, and/or average daily balance in a checking account.

At 1204, the consumer information is scored. For example, the consumer information may be input to a set of rules or calculations to generate the score 812 in the consumer database 800. According to some embodiments, different scores may be generated in connection with different credit products (e.g., different credit products might have different guidelines or formulas that are used to generate the score). According to other embodiments, the score is at least partially based on the information about other consumers (e.g., indicating whether or not a particular consumer is in the top five percent with respect to a certain metric).

At 1206, the score is evaluated. For example, a score might be compared to threshold values "T1" and "T2." According to other embodiments, simpler or more complex scores and/or evaluations may be appropriate. For example, all consumers might be evaluated to determine whether they are "high" or "low" risk. As another example, consumer information might be evaluated based on a flow or process that branches out in different ways based on the consumer's habits (e.g., the types of merchants he or she has used in connection with the pre-paid card account).

Based on the evaluation at 1206, a financial institution might determine that no credit migration path is appropriate for the consumer at 1208. For example, no migration path might be selected (and thus, no credit product might be offered) if the consumer's score was below a minimal threshold value T1. In contrast, a first migration path may be selected (and the initial credit product along that path might be offered) at 1210 for consumers who met the minimal threshold value T1 but failed to meet another threshold value T2. Similarly, a second migration path may be selected (and the initial credit product along that path might be offered) at 1212 to consumers who met both threshold values T1 and T2.

Thus, information about a consumer, perhaps including his or her responsible use of a pre-paid card account, may help him or her eventually migrate to other appropriate, higher-level credit products.

As used herein and in the appended claims, the term pre-paid "card" account should be understood to refer not only to card-shaped items bearing magnetic stripes but also to other devices, whether or not card shaped, used to input an identification number for accessing a financial account. Thus a pre-paid "card" also includes devices that report account access identification information by proximity coupling, radio frequency identification (RFID) techniques, and the like.

According to some embodiments, a party (such as a credit rating agency) receives supplemental information about a consumer associated with a first level of credit availability. The party then selects for the consumer one of a plurality of potential credit migration paths based on the supplemental information, wherein each potential credit migration path: begins at the first level of credit availability, includes a plurality of intermediate credit products, and ends at a level of credit availability higher than the first level. The party also transmits information associated with an intermediate credit product based on the selected credit migration path. For example, a credit rating agency may transmit the indication to another party (and that indication may be used by the other party to select and provide appropriate credit product offers to the consumer).

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A computer-implemented method of offering a credit product to a consumer, comprising:
    associating the consumer with a pre-paid card account and a first level of credit availability;
    facilitating purchase transactions for the consumer via the pre-paid card account, including transferring funds out of the pre-paid card account;
    transferring funds of the consumer to re-load the pre-paid card account;
    tracking the consumer's usage of the pre-paid card account;
    automatically selecting for the consumer, by a credit migration path selection engine, one of a plurality of potential credit migration paths based on the tracked usage, wherein each potential credit migration path: begins at the first level of credit availability, includes a pre-determined sequence of a plurality of intermediate credit products of a plurality of different types, and ends at a level of credit availability higher than the first level, and further wherein a first potential credit migration path includes at least one intermediate credit product of a first type and a second potential credit migration path does not include any intermediate credit product of the first type; and
    transmitting to the consumer an offer of an intermediate credit product based on the selected credit migration path.

2. The method of claim 1, wherein the automatic selection is further based at least one of: (i) credit bureau data, (ii) income data, (iii) expense data, (iv) payment history data, (v) net worth data, (vi) bankruptcy data, (vii) existing balance data, (viii) employment data, or (ix) demographic data.

3. The method of claim 1, wherein the intermediate credit product of the first type comprises: (i) a partially secured credit card account, (ii) a pre-paid card account, (iii) a card account with overdraft protection, or (iv) a private label credit card account.

4. The method of claim 1, wherein the first level of credit availability is associated with at least one of: (i) a partially secured credit card account, (ii) a pre-paid card account, (iii) a card account with overdraft protection, or (iv) a private label credit card account.

5. The method of claim 1, wherein at least one of the ending levels of credit availability is associated with at least one of: (i) a partially secured credit card account, (ii) a private label credit card account, (iii) a card account with overdraft protection, or (iv) a traditional credit card account.

6. The method of claim 1, wherein said selecting comprises:
evaluating a score indication associated with the consumer and at least one threshold value associated with a potential migration path.

7. The method of claim 1, wherein at least some of the steps are performed by a financial institution acting as at least one of a bank account or a debit card processor substitute.

8. The method of claim 7, wherein said facilitating is performed to allow point-of-sale purchases by the consumer.

9. A computer-implemented method of offering a credit product to a consumer, comprising:
associating a consumer with a pre-paid card account, the consumer being associated with a first level of credit availability;
receiving a transaction request, associated with the pre-paid card account, from a remote merchant device;
transmitting a transaction approval to the remote merchant device;
transferring funds out of the pre-paid card account based on the transaction request;
receiving a re-load indication from the consumer;
transferring funds for the consumer to re-load the pre-paid card account in response to the re-load request;
storing transaction information associated with the consumer's usage of the pre-paid card account;
receiving from a third-party supplemental information associated with the consumer;
based on the stored transaction information and the supplemental information, automatically generating a score associated with the consumer;
selecting for the consumer one of a plurality of potential credit migration paths based on the generated score and threshold values associated with each potential credit migration path, wherein each potential credit migration path: begins at the first level of credit availability, includes a pre-determined sequence of a plurality of intermediate credit products of a plurality of different types, and ends at a level of credit availability higher than the first level, and further wherein a first potential credit migration path has a first number of intermediate credit products, including at least one intermediate credit product of a first type and a second potential credit migration path has a second number of intermediate credit products, the second number being different than the first number, and the second potential migration path does not include any intermediate credit product of the first type; and
offering the consumer an intermediate credit product based on the selected credit migration path.

10. An apparatus to offer a credit product to a consumer, comprising:
a processor; and
a storage device in communication with said processor and storing instructions adapted to be executed by said processor to:
associate the consumer with a pre-paid card account and a first level of credit availability;
facilitate purchase transactions for the consumer via the pre-paid card account, including transferring funds out of the pre-paid card account;
transfer funds of the consumer to re-load the pre-paid card account;
track the consumer's usage of the pre-paid card account;
select for the consumer one of a plurality of potential credit migration paths based on the tracked usage, wherein each potential credit migration path: begins at the first level of credit availability, includes a pre-determined sequence of a plurality of intermediate credit products of a plurality of different types, and ends at a level of credit availability higher than the first level, and further wherein a first potential credit migration path includes at least one intermediate credit product of a first type and a second potential credit migration path does not include any intermediate credit product of the first type; and
transmit to the consumer an offer of an intermediate credit product based on the selected credit migration path.

11. The apparatus of claim 10, wherein said storage device further stores at least one of: (i) a consumer database, (ii) a pre-paid card account database, (iii) a potential credit migration path database, or (iv) a credit product database.

12. The apparatus of claim 10, further comprising:
a communication device coupled to said processor and adapted to communicate with at least one of: (i) a point of sale device, (ii) an automated teller machine device, (iii) a consumer device, or (iv) a credit bureau device.

13. A non-transitory computer-readable medium storing instructions adapted to be executed by a processor to perform a method of offering credit products to consumers, said method comprising:
associating the consumer with a pre-paid card account and a first level of credit availability;
facilitating purchase transactions for the consumer via the pre-paid card account, including transferring funds out of the pre-paid card account;
transferring funds of the consumer to re-load the pre-paid card account;
tracking the consumer's usage of the pre-paid card account;
selecting for the consumer one of a plurality of potential credit migration paths based on the tracked usage, wherein each potential credit migration path: begins at the first level of credit availability, includes a pre-determined sequence of a plurality of intermediate credit products of a plurality of different types, and ends at a level of credit availability higher than the first level, and further wherein a first potential credit migration path includes at least one intermediate credit product of a first type and a second potential credit migration path does not include any intermediate credit product of the first type; and
transmitting to the consumer an offer of an intermediate credit product based on the selected credit migration path.

14. A method, comprising:
receiving supplemental information about a consumer associated with a first level of credit availability;
selecting for the consumer one of a plurality of potential credit migration paths based on the generated score and threshold values associated with each potential credit migration path, wherein each potential credit migration path: begins at the first level of credit availability, includes a pre-determined sequence of a plurality of intermediate credit products of a plurality of different types, and ends at a level of credit availability higher than the first level, and further wherein a first potential credit migration path has a first number of intermediate credit products, including at least one intermediate credit product of a first type and a second potential credit migration path has a second number of intermediate credit products, the second number being different than the first number, and the second potential migration path does not include any intermediate credit product of the first type; and transmitting to the consumer information associated with an intermediate credit product based on the selected credit migration path.

\* \* \* \* \*